T. J. & P. F. HOWE.
Barbing-Machine.

No. 228,635.  Patented June 8, 1880.

Witnesses.
Frank W. Heers.
Erastus W. Smith.

Inventors: Thomas J. Howe,
Patrick F. Howe,
By Thomas G. Orwig, Atty.

T. J. & P. F. HOWE.
Barbing-Machine.

No. 228,635. Patented June 8, 1880.

Witnesses:
P. C. Kenyon,
Frank W. Heers,

Inventors:
Thomas J. Howe,
Patrick F. Howe,
By Thomas G. Orwig, Atty.

UNITED STATES PATENT OFFICE.

THOMAS J. HOWE AND PATRICK F. HOWE, OF DES MOINES, IOWA.

BARBING-MACHINE.

SPECIFICATION forming part of Letters Patent No. 228,635, dated June 8, 1880.

Application filed August 15, 1878.

*To all whom it may concern:*

Be it known that we, THOMAS J. HOWE and PATRICK F. HOWE, of Des Moines, in the county of Polk and State of Iowa, have invented an Improved Machine for Barbing Fence-Wire, of which the following is a specification.

Our invention relates to that class of machines in which fence-wire is passed from one reel to another and wire barb-pieces wrapped upon it at regular intervals of space. Heretofore the barb-pieces coiled upon the fence-wire have been liable to slide, and to prevent them from slipping out of place we swage them fast to the wire after they are formed, and for this purpose we mount an anvil and hammer contiguous to the barb-forming device in such a manner that the hammer can be operated by means of a treadle, and by the same motion that moves the fence-wire in the barb-forming mechanism to the point where the next barb is to be fixed thereon.

We also improve the barb-forming mechanism by mounting the pinion that wraps the barb-pieces upon the fence-wire in such a manner that it is made to move simultaneously with the jaws and toward the jaws by the same motion of the treadle that closes the jaws upon the fence-wire to hold the fence-wire stationary while the pinion is being revolved to coil the barb-pieces upon the fence-wire.

By means of the longitudinal movement of the rotating pinion thus obtained a succession of coils can be advantageously formed and closely crowded together, so that the action of the swaging-hammer upon the coils will rigidly unite the barb-pieces and the fence-wire and produce superior barbed fence material.

Figure 1:
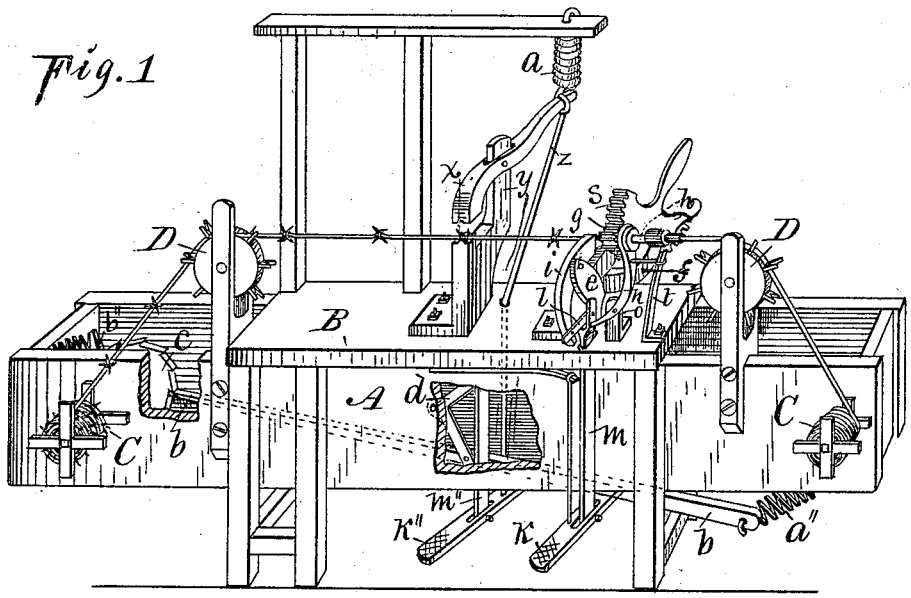
Figure 2:
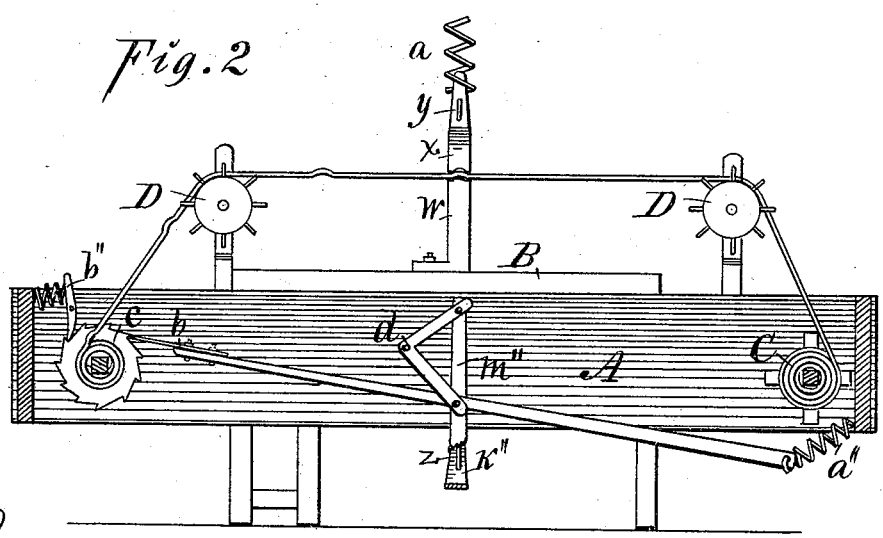
Figure 3:
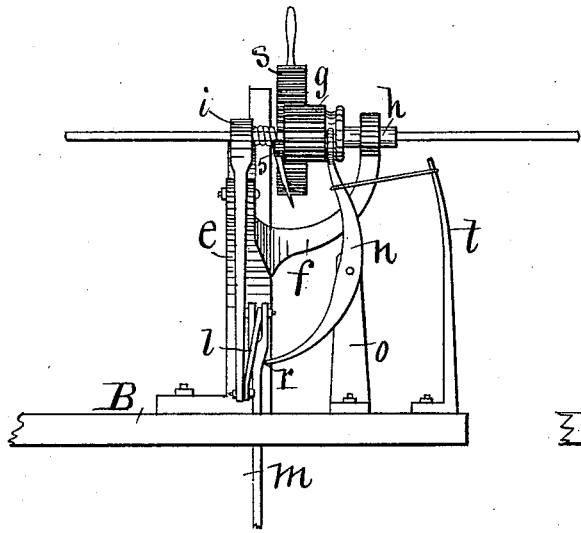
Figure 4:
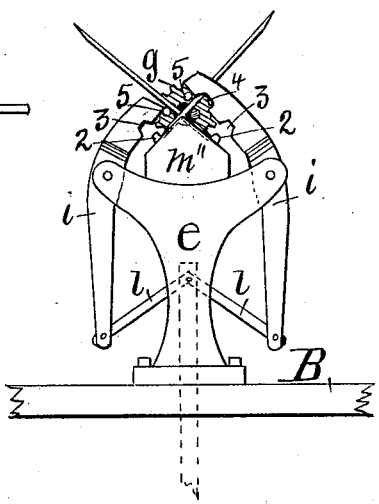
Figure 5:
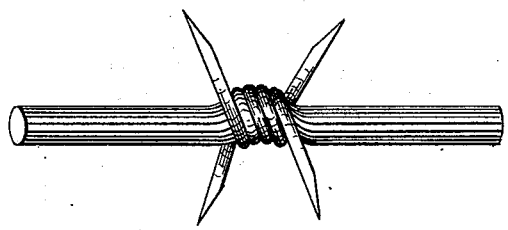

Figure 1 of the drawings is a perspective view. Fig. 2 is a longitudinal section. Fig. 3 is an elevation of the barb-forming mechanism. Fig. 4 is a transverse view of the jaws that hold the barb-pieces preparatory to being wrapped upon the fence-wire. Fig. 5 is a view of our swaged barb. Jointly considered, they illustrate the construction and operation of our invention.

A is a trough-form bench supported upon a suitable frame. B is a heavy plank or plate fixed on top of the bench, to cover its central portion, and to form a base upon which to mount the anvil and barb-forming mechanism. The complete bench thus formed is adapted to support a duplicate of all the operating mechanism in such a manner that two complete machines can be readily operated thereon at the same time by two persons standing at the opposite sides and opposite ends of the bench.

$m''$ (shown in Fig. 4) is a barb-rest, in the form of a triangular-shaped block fixed upon the top and center of the post $e$, to support the wire barb-pieces when they are placed in position, as shown, to be wrapped upon the fence-wire. It has grooves in its inclined top faces to partially admit the lower ends of the barb-pieces, and stops 2 2 at the ends of its grooves, against which stops the lower ends of the barb-pieces rest.

3 3 are recesses in the jaws $i$, corresponding with the stops 2, as required, to allow the upper ends of the jaws to close upon the lower ends of the barb-pieces and clamp them fast upon the inclined faces of the rest $m''$.

4 is a second recess near the top of the longest jaw, that allows the fence-wire to be inclosed by the jaw and held when the jaws are closed upon the rest.

5 5 are studs projecting from the side face of the pinion $g$, to engage the barb-pieces and coil them around the fence-wire when the jaws $i$ are closed and the pinion is rotated.

C C are reels mounted at the sides and ends of the bench A. The one at the right hand contains plain fence-wire, and as it is barbed it is run off and wound upon the reel at the opposite end.

D D are guiding-pulleys that direct the fence-wire and keep it in line with the barb-forming and barb-swaging devices as it passes from one reel to the other.

$e$ is a post bolted upon the base-plate B to support the barb-forming mechanism. It has a curved arm, $f$, extending laterally to support our sliding and revolving pinion $g$ upon the stationary and non-revolving tubular shaft $h$, through which the fence-wire is passed.

$i\ i$ are jaws pivoted to branches of the post $e$ at their top portions, and connected at their lower ends to a treadle, $k$, by means of links $l\ l$ and a bar, $m$. These jaws $i\ i$ have recesses $i''\ i''$, into which projections from $e$ enter to steady the jaws.

$n$ is a flexible lever, pivoted to a post, $o$, that is fixed to the plate B in such a manner that the top end of the lever engages the pinion $g$, and its lower end engages a cam, $r$, on the top portion of the bar $m$.

When the treadle $k$ is pressed down the cam $r$ operates the lever $n$ and presses the pinion $g$ toward the jaws $i$, as required, to come into contact with the wire barb-pieces that must have their ends placed in position to be held by the jaws $i$, which have inclined grooves to hold the barb-wires, and one of which has a recess, $i'$, for the fence-wire, as illustrated by Fig. 4, while they are being wrapped upon the fence-wire.

$s$ is a segmental drive-wheel supported by an arm extending from the post $e$. By means of this wheel $s$ the pinion $g$ is readily rotated, and two studs, $g'$, in this instance diametrically opposite each other upon the end of the pinion, engage the wire barb-pieces, as shown in Fig. 3, and carry the ends of the barb-pieces around the fence-wire to produce successive coils.

The flexible lever $n$, by which the pinion $g$ is moved longitudinally on its shaft $h$ to engage the barb-pieces, will yield sufficiently to allow the pinion to recede from the jaws $i$ as the coils are being formed, and, by means of the receding pinion, are being crowded close together upon the fence-wire to produce a compact body for the barb, that is thereby adapted to be swaged to the fence-wire, as illustrated by Fig. 5.

$t$ is a spring fixed to the base B, and connected at its top end with the top portion of the pivoted lever $n$, to hold the pinion $g$ away from the jaws $i$ when in a normal position.

$w$ is an anvil mounted upon the base B in line with the post $e$, and in such a position relative to the tubular shaft $h$ that the fence-wire or cable passing through the shaft and stretched over the guiding-pulleys D will rest upon a suitable die formed in or attached to the top of the anvil.

$x$ is a trip-hammer pivoted to an arm, $y$, extending rearward and upward from the anvil.

$z$ is a rod connecting the rear end of the hammer with a treadle, $k''$.

$a$ is a spring fixed to the ceiling of a building or other suitable support immediately over the rear end of the hammer, to which it is attached, to force the hammer down and cause it to strike upon the anvil and swage the barb to the fence-wire whenever operated by means of the lever $k''$.

$b$ is a lever suspended in the trough-form bench, to connect the treadle $k''$ with the reel upon which the fence-wire is wound after being barbed.

$c$ is a ratchet-wheel fixed upon the same shaft that carries the reel at the left-hand end of the machine.

$d$ is a bell-crank lever mounted in the bench A. The suspended lever $b$ is pivoted to its lower arm, and its upper arm is connected with the treadle $k''$ by means of a bar, $m$.

$a''$ is a spring at the right-hand and lower end of the long lever $b$. It serves to elevate the lever after being depressed by means of the treadle.

$b''$ is a pawl that keeps the ratchet-wheel $c$ from revolving backward to follow the backward motion of the actuating-lever $b$.

In the practical operation of our improved machine, after the wire barb-pieces are coiled upon the fence-wire, as contemplated by this class of machines, the operator, by pressing his foot upon the treadle $k''$, can readily lift the trip-hammer $x$, and by the same motion turn the ratchet-wheel $c$ sufficiently to wind the fence-wire upon the reel, and thereby move the barb last formed from the barb-forming mechanism to the anvil $w$, and also by the same motion bring the unbarbed wire into proper position relative to the barb-forming mechanism to receive a second barb, and a succession of barbs at uniform distances apart. Relaxing the pressure of the foot will allow the elevated hammer to descend and strike the barb and swage it upon the fence-wire by making a short bend in the fence-wire and pressing the coils of the barb-pieces into shape to conform with the short bend in the fence-wire. The barb-pieces and fence-wire are thus firmly united, and the barbs are thereby prevented from sliding away from the points located, and remain at uniform distances apart.

We claim—

1. In a barb-forming machine, the anvil $w$ and trip-hammer $x$, in combination with the barb-forming mechanism $e$ $g$ $h$ $i$ $s$ $l$ $m$ $k$ and the wire-moving mechanism C C D D $b$ $c$ $d$ $m''$ $k''$ $y$ $z$, substantially as and for the purposes set forth.

2. The bench A B, the reels C C, the guide-pulleys D D, the anvil and hammer $w$ $x$, the bell-crank lever $d$, the suspended long lever $b$, the treadle $k''$, the spring $a$, the rod $z$, and the ratchet-wheel $c$, arranged and combined substantially as shown and described, to operate in the manner specified.

3. The pivoted lever $n$, in combination with the sliding pinion $g$ and the treadle-bar $m$, having a cam or bend, $r$, substantially as and for the purpose specified.

4. The post $e$, the barb-rest $m''$, having grooves in its inclined faces, and stops 2 2, and the pivoted jaws $i$, having recesses 3 3, arranged and combined substantially as shown and described, to operate in the manner set forth.

THOMAS J. HOWE.
PATRICK F. HOWE.

Witnesses:
FRANK W. HEERS,
ERASTUS W. SMITH.